United States Patent [19]

Kalous

[11] 3,999,679

[45] Dec. 28, 1976

[54] MOUNTING COVER

[75] Inventor: Leo R. Kalous, Cedar Rapids, Iowa

[73] Assignee: Rockwell International Corporation, El Segundo, Calif.

[22] Filed: Aug. 13, 1973

[21] Appl. No.: 387,985

[52] U.S. Cl. .................. 220/327; 220/62; 220/3.8

[51] Int. Cl.[2] .............. B65D 45/00; H02G 3/08; B65D 7/42

[58] Field of Search ........... 220/62, 3.8, 327, 3.94, 220/3.92, 3.4, 3.5, 3.6, 3.7

[56] References Cited

UNITED STATES PATENTS

| | | | |
|---|---|---|---|
| 1,537,325 | 5/1925 | Smith et al. ............ | 220/3.8 |
| 2,155,128 | 4/1939 | Gray .................... | 220/62 |
| 2,445,548 | 7/1948 | Wiepert ................. | 220/62 X |
| 2,488,710 | 11/1949 | Cooper .................. | 220/62 X |
| 2,500,338 | 3/1950 | Bergstein ............... | 220/62 X |
| 2,695,726 | 11/1954 | Chatfield ............... | 220/327 |
| 2,804,116 | 8/1957 | Van Niel et al. ......... | 220/3.8 X |
| 2,883,228 | 4/1959 | Roberts, Jr. ............ | 220/3.8 X |

Primary Examiner—William Price
Assistant Examiner—Steven M. Pollard
Attorney, Agent, or Firm—Howard R. Greenberg; Robert J. Crawford

[57] ABSTRACT

A mounting cover for enclosing electronic components or the like utilizes the side walls as compression members for receiving the compressive forces produced by the screw fasteners used to mount the cover to a surface.

7 Claims, 4 Drawing Figures

MOUNTING COVER

BACKGROUND OF THE INVENTION

The present invention pertains to mounting covers used for enclosing electronic components or the like.

Quite often it is desirable, if not necessary, to provide an enclosure for electronic components (for example, for protective or shielding purposes) which is readily removable for permitting easy access to the components. Such an enclosure is normally provided by a rectangular metal box cover which fits over the components and is held to the surface on which the components are mounted by screw fasteners which pass through the top of the cover into threaded apertures located in the mounting surface. Since the thickness of the cover is not too great, it is common to provide a hollow post or column underneath the head of each screw fastener through which the screw shaft passes to prevent crushing the top of the cover by the compressive forces produced as the screws are tightened into place. These compression posts or columns, which are normally an integral part of the cover, not only add to the cost of manufacturing the cover, but detract from the amount of usable space underneath it for accommodating the components. Since these covers are used in great quantities, even a slight savings in both manufacturing cost and usable space could prove quite meaningful and advantageous.

A further consideration is the mounting and testing of the components located underneath the cover. By providing a removable cover, the mounting of the components is greatly facilitated since an assembler can mount the components on a surface before the cover is put in place, thus avoiding the need for maneuvering in areas which quite often are small and constrained. A problem sometimes arises however, in testing or troubleshooting the components once assembled, since it may be expeditious, if not absolutely necessary during testing to maintain the cover walls in place, such as for example, shielding purposes. This is especially true when the cover has a compartmented design for isolating from one another various areas thereunder. Thus it would be desirable to provide a mounting cover which permits easy access to the enclosed components with the side walls held in place.

With the foregoing in mind, it is a primary object of the present invention to provide a new and improved mounting cover which does not require special compression posts or columns.

It is a further object of the present invention to provide such a new and improved mounting cover which is easily and inexpensively fabricated from a flat sheet of material.

It is still a further object of the present invention to provide a new and improved mounting cover which permits easy access to the enclosed components while the side walls are maintained in place.

These objects, as well as others, will become more readily apparent from the detailed description which follows when considered in conjunction with the appended drawing.

BRIEF DESCRIPTION OF THE INVENTION

A mounting cover for enclosing electronic components or the like utilizes the side walls as compression members in lieu of special posts or columns for receiving the compressive forces produced by the screw fasteners used to mount the cover to a surface. The side walls have sufficient thickness to receive the compressive forces without crumpling. The mounting screws are passed through openings in the top of the cover which may be integrally formed with or joined to the side walls with the openings being located such that the screw heads must contact the tops of the side walls when in place.

A flat pattern sheet is disclosed from which the rectangular box cover embodying the invention herein can be easily formed.

DETAILED DESCRIPTION OF THE INVENTION

Figure 1:
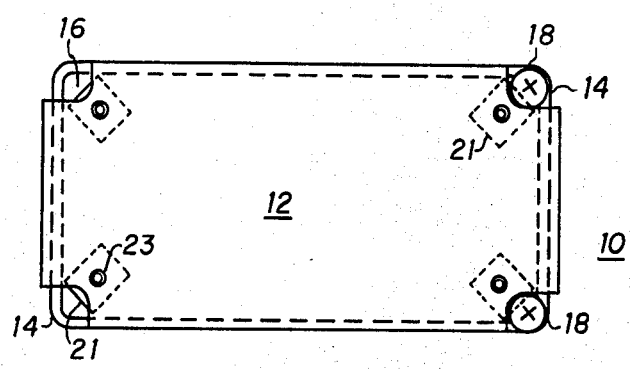
FIG. 1 is a planar view of a mounting cover, embodying the invention, as viewed from above when fastened to a surface.
Figure 2:
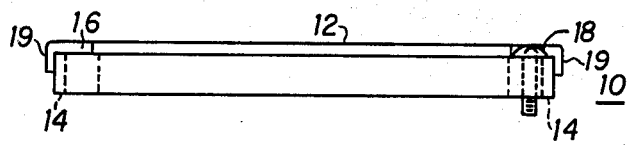
FIG. 2 is a front view of the mounting cover depicted in FIG. 1.

The mounting cover is represented throughout the figures generally by reference numeral 10. As shown in FIGS. 1 and 2, the mounting cover 10 comprises a top 12 and side walls 14 which may be two separate pieces joined together by any suitable means or a single piece fabricated to form a rectangular box. The mounting cover 10 is shown herein in the form of a rectangular box only for exemplary purposes since as will become apparent hereinafter, the cover can take any suitable shape desired for accommodating the components over which the cover is to be mounted.

The mounting screws 18, (only two shown) used for fastening the cover 10 to a surface, pass through the openings 16 in order to engage the threaded apertures located in the surface directly below for receiving the screw shafts. The openings 16 are made large enough so as to accommodate the heads of the screws 18, yet small enough so that together with the thickness of the side walls 14 a portion of the under sides of the screw heads must contact the top of the side walls 14 when the screws 18 are tightened into place. Consequently, as a screw 18 is tightened, the compressive force produced thereby is applied directly to the side walls 14 whose thickness is great enough to receive this force and transmit it to the surface without being crumpled. Once the four screws are tightened in place the mounting cover 10 is completely affixed to the surface since the compressive forces produced under the screw heads are applied to the surface directly via the side walls 14, which, as already mentioned, are integrally formed with or joined to the top 12. In this connection it should be noted that as shown in FIG. 1, the top 12 can be a separate piece joined to the side walls 14 merely by a force fit by providing at least two resilient sides 19 which grip the side walls 14 when the top 12 is pressed down. In this manner the top 12 can be easily removed while the side walls 14 are retained in place to permit access to the enclosed components for testing purposes. It should be further noted that the cover 10 could be of a compartmented design if desired, merely by providing appropriate separating walls inside the enclosure.

Although in the preferred embodiment the openings 16 are shown extending to the edges of the top 12 and are large enough so as to accommodate the screw heads entirely in order that they might be flush with the top surface of the cover 10 when tightened, it may be readily appreciated that all that is required is that the openings 16 be large enough to receive the shafts of the screws 18 and that the openings 16 be located at the insides of the walls 14 so that when the screws 18 are tightened, the resultant compressive forces are transmitted to the top of the walls 14 through the cover top 12 to avoid deforming the cover top 12. As shown in FIG. 1 the portion of the opening 16 not located over the side walls 14 may be made small enough relative to the size of the screw head so that the screw head abuts the edge of the top 12 when the screw 18 is tightened into place so that there is no tendency for the underside of the screw head to slide off the side walls 14.

To aid in aligning the screw shaft with the threaded aperture in the mounting surface, it may be desirable to provide a flat spring clip 21 whose vertical surface parallels the axis of the screw shaft and is spring biased to exert a slight pressure thereon. As the screw shaft is passed through the opening 16, the clip 21 exerts sufficient pressure on it so that it is automatically guided into the threaded aperture. The clip 21 may be mounted to the cover 10 by any suitable means such as the rivet 23 which holds the top of the clip 21 to the top 12.

Figure 3:
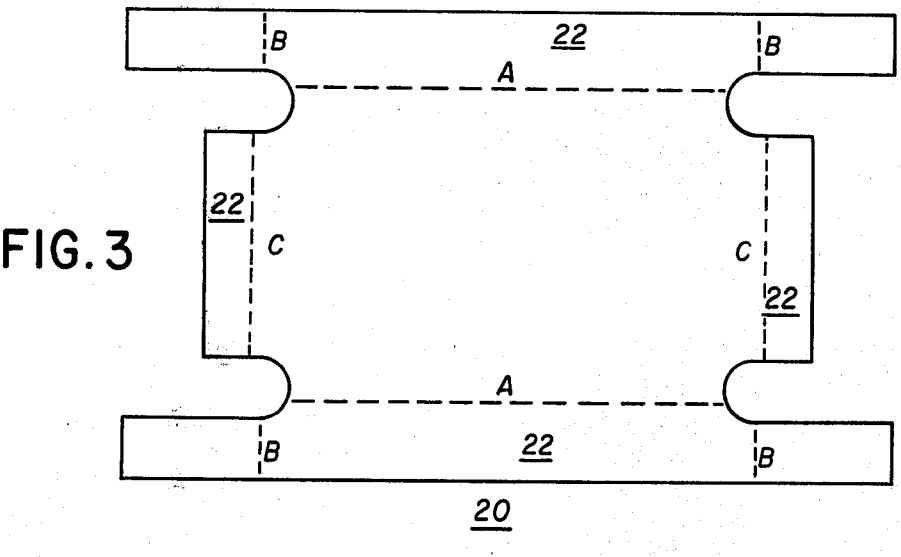
FIG. 3 shows a flat sheet having uniform thickness and a pattern from which the mounting cover of FIG. 1 can be formed merely be bending the various flaps along the dotted lines.

The rectangular box mounting cover 10 exemplified herein may be easily and inexpensively formed from a flat sheet of any suitable material having a pattern such that when flaps thereof are folded the box cover top 12 is automatically formed with the openings 16 in each of the corners of its top 12. Such a pattern is shown in FIG. 3, wherein a flat sheet 20 has four flaps 22, each being defined by an edge of the sheet 20 and a dashed line A or C which is parallel thereto. The flaps 22 are bent at an angle of approximately 90° to form the side walls. To form the cover 10, the sheet 20 would be folded along the dashed lines designated by the letters A, B and C. After having completed the above bends, the sheet 20 is formed into the mounting cover 10 shown in isometric view by FIG. 4. The openings 16 are automatically provided upon bending by the pattern curves in between the flaps 22.

Figure 4:
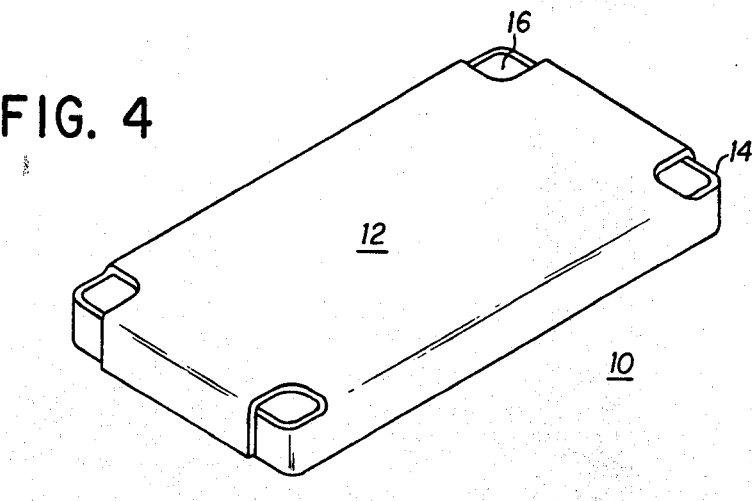
FIG. 4 is an isometric view of the mounting cover formed from the sheet depicted in FIG. 3.

It will be noted that although the mounting cover 10 of FIG. 4 is of a simple unitary construction, it nevertheless provides the openings 16 properly located for receiving the mounting screws 18 so that the compressive forces are applied directly to the side walls 14. It will be further noted that no unnecessary support posts or columns, which would otherwise detract from the available space for components under the mounting cover, are required since the force receiving members are already provided by the side walls 14. Thus the mounting cover 10 formed from the flat sheet 20 of FIG. 3 provides the novel and unique features of the invention.

The mounting cover disclosed herein is thus seen to be simple and inexpensive in construction, capable of being formed from a flat sheet of material, yet providing suitable means for affixing same to a surface using screw fasteners without interfering with the available space underneath the cover. Since various modifications to the particular embodiment described herein are possible without detracting from the scope and spirit of the invention, this embodiment is to be construed merely as exemplary and not restrictive of the invention as claimed hereinafter.

What is claimed is:

1. A cover for mounting on a surface comprising: screw fasteners with heads, walls of a predetermined thickness which describe an enclosed area and are capable of receiving compressive forces without crumpling and a top whose periphery conforms to the outside periphery of said walls and which is removable from said walls and has at least two resilient sides for gripping said walls when placed thereon, said top being formed with at least two openings for permitting the screws to pass therethrough into the surface and located such that portions of the screw heads bear directly down on the walls when in place to produce said compressive forces wherein the openings extend to the edge of the cover top and describe areas at least as large as the screw heads.

2. The cover of claim 1 wherein said openings are no larger than the screw heads so that the heads abut the edges of said top when the screws are tightened into place.

3. A cover for mounting on a surface with screw fasteners which extend into the surface from the top, said cover having walls of a predetermined thickness which describe an enclosed area and are capable of receiving compressive forces without crumpling, a top whose periphery conforms to the outside periphery of said walls, said top being formed with at least two openings for receiving the mounting screws located such that portions of the screw heads bear directly down on the walls when in place to produce compressive forces wherein the openings extend to the edge of the cover top and describe areas at least as large as the screw heads and individual spring clip means located below each of said openings for exerting a slight pressure on the screw shaft to guide it into place.

4. The cover of claim 3 wherein said openings are no larger than the screw heads so that the heads abut the edges of said top when the screws are tightened into place.

5. The cover of claim 4 which is formed by bending two pairs of opposite flaps and bending the ends of the flaps of one pair so that each end of one flap abuts an end of the other flap.

6. A cover for mounting on a surface with screw fasteners which extend into the surface from the top, said cover having walls of a predetermined thickness which describe an enclosed area and are capable of receiving compressive forces without crumpling, a top whose periphery conforms to the outside periphery of said walls, said top being formed with at least two openings for receiving the mounting screws located such that portions of the screw heads bear directly down on the walls when in place to produce compressive forces wherein the openings extend to the edge of the cover top and describe areas at least as large as the screw heads and wherein the cover is a rectangular box and is made from a flat pattern sheet of material of uniform thickness by bending flaps thereof at an angle of approximately 90° to form the walls and the cover top is automatically formed with openings in its four corners by the pattern curves between the flaps upon said bending.

7. The cover of claim 6 wherein said openings are no larger than the screw heads so that the heads abut the edges of said top when the screws are tightened into place.

* * * * *